United States Patent
Bertz et al.

(10) Patent No.: US 8,160,603 B1
(45) Date of Patent: Apr. 17, 2012

(54) METHOD AND SYSTEM FOR PROVIDING STREAMING MEDIA CONTENT TO ROAMING MOBILE WIRELESS DEVICES

(75) Inventors: Lyle T. Bertz, Lee's Summit, MO (US); Woojae J. Lee, Manhattan, KS (US); Badri P. Subramanyan, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 584 days.

(21) Appl. No.: 12/365,081

(22) Filed: Feb. 3, 2009

(51) Int. Cl.
*H04W 72/00* (2009.01)

(52) U.S. Cl. .................. 455/452.2; 455/453; 455/456.3; 455/406; 370/254; 370/352

(58) Field of Classification Search .................. 455/452, 455/406; 370/254, 352
See application file for complete search history.

(56) References Cited

U.S. PATENT DOCUMENTS

| | | | |
|---|---|---|---|
| 7,283,803 B2 * | 10/2007 | Karaoguz et al. ............ | 455/406 |
| 7,386,311 B2 | 6/2008 | Soga et al. | |
| 7,701,872 B2 * | 4/2010 | Islam et al. .................... | 370/254 |
| 2004/0057420 A1 * | 3/2004 | Curcio et al. ................. | 370/352 |
| 2008/0052414 A1 | 2/2008 | Panigrahi et al. | |
| 2008/0062322 A1 | 3/2008 | Dey et al. | |
| 2008/0086570 A1 | 4/2008 | Dey et al. | |

OTHER PUBLICATIONS

Ortiva Wireless, "Ortiva Stream Shaper", 2006.
Ortiva Wireless, "Ortiva Mobile-CDN", 2007.
NTT DoCoMo, Inc., i-mode Center Information, Jun. 2008.

* cited by examiner

*Primary Examiner* — David Q Nguyen

(57) ABSTRACT

A mobile device requests streaming media content while being served by a first radio access network in a market area. A content streaming system obtains the requested media content, adapts the media content using a first total bandwidth availability curve (TBAC) to provide adapted media content, and streams the adapted media content to the mobile device. The first TBAC is determined from actual or projected network conditions in the market area. While receiving the media content, the mobile device roams to a second radio access network in the market area. The mobile device provides a roaming indication to the content streaming system. In response to the roaming indication, the content streaming system adapts the media content using a second TBAC to provide roaming-adapted media content and streams the roaming-adapted media content to the mobile device. The second TBAC indicates reduced bandwidth availability relative to the first TBAC.

18 Claims, 4 Drawing Sheets

METHOD AND SYSTEM FOR PROVIDING STREAMING MEDIA CONTENT TO ROAMING MOBILE WIRELESS DEVICES

BACKGROUND

Radio access networks, such as cellular wireless networks, are increasingly being used to provide streaming media content to mobile wireless devices. Such streaming media content may include audio and/or video, e.g., music selections, movies, or television programming.

Because of the real-time nature of such streaming media content, the user experience can be adversely affected by changing network conditions. For example, if the available bandwidth suddenly decreases, the user may notice a degradation in quality such as a media stream that stalls. One way to reduce such problems, is to adapt the streaming media content to changing network conditions. For example, if bandwidth availability decreases, the data rate of the streaming media content may be reduced (e.g., by changing the frame rate, frame type, or quantization level) in order to avoid having the media stream stall.

The technology to adapt media streams in this way is commercially available from Ortiva Wireless, Ja Jolla, Calif. Further information regarding adaptive streaming can be found in the following published U.S. patent applications, which are incorporated herein by reference: U.S. Pub. No. 2008/0052414, published Feb. 28, 2008; U.S. Pub. No. 2008/0062322, published Mar. 13, 2008; and U.S. Pub. No. 2008/0086570, published Apr. 10, 2008.

OVERVIEW

In accordance with a first principal aspect, an exemplary embodiment provides a method for providing digital content to a mobile wireless device operating in a market area. Digital content is streamed to the mobile wireless device at a first data rate via a first wireless carrier. A roaming indication is received, wherein the roaming indication indicates that the mobile wireless device is no longer being served by the first wireless carrier. In response to the roaming indication, the digital content is streamed to the mobile wireless device at a second data rate via a second wireless carrier, wherein the second data rate is lower than the first data rate.

In accordance with a second principal aspect, an exemplary embodiment provides a method for providing digital content to a mobile wireless device operating in a market area. Original digital content is obtained. A first temporal bandwidth availability curve (TBAC) is obtained, wherein the first TBAC indicates bandwidth availability as a function of time in the market area. The original digital content is adapted in accordance with the first TBAC to provide adapted digital content. The adapted digital content is streamed to the mobile wireless device. A roaming indication is received from the mobile wireless device. In response to the roaming indication, a second TBAC is obtained, wherein the second TBAC indicates a reduced bandwidth availability relative to the first TBAC. The original digital content is adapted in accordance with the second TBAC to provide roaming-adapted digital content. The roaming-adapted digital content is streamed to the mobile wireless device.

In accordance with a third principal aspect, an exemplary embodiment provides a system for providing digital content to a mobile wireless device operating in a market area. The system comprises: a source of digital content; an adaptation selector for selecting from among a plurality of adaptation metrics based on signaling from the mobile wireless device; a content adaptor for adapting the original digital content, in accordance with an adaptation metric selected by the selection system, to provide adapted digital content; and a content streamer for streaming the adapted digital content to the mobile wireless device.

DETAILED DESCRIPTION OF EXEMPLARY EMBODIMENTS

1. Overview

The inventors have recognized that the technique of adapting streaming media content can be used for purposes other than compensating for changing network conditions. For example, a wireless service provider may adapt streaming media content in accordance with one or more network policies. When such network policies are used, the adaptation of streaming media content may depend on various factors, such as the wireless network being used, the type of mobile wireless device being used, the user's subscription level, the type of streaming media content, the time of day, and/or other factors.

As one example, a wireless service provider may adapt streaming media content for a mobile wireless device in different ways, depending on whether the mobile wireless device is roaming. Thus, one adaptation metric may be used when the mobile wireless device is being served by the wireless service provider's own network, and a different adaptation metric may be used when the mobile wireless device is roaming, i.e., when the mobile station is being served by a different wireless service provider's network. The adaptation metric used for roaming may reduce the data rate of the streaming media content, so as to reduce the roaming charges that would be incurred by the wireless service provider.

To achieve this result, the mobile wireless device may be configured to send a roaming indication when the mobile wireless device detects that it is roaming, and the adaptation metric used to adapt the streaming media content may depend on whether this roaming indication has been received. Thus, in the absence of a roaming indication, a first adaptation metric may be used to adapt the streaming media content. While receiving the streaming media content, the mobile wireless device may detect that it is now roaming and responsively send a roaming indication. In response to the roaming indication, a second adaptation metric may then be used to adapt the streaming media content. The second adaptation metric may provide a lower data rate than the first adaptation metric for the same network conditions.

In this regard, the first and second adaptation metrics may be first and second total bandwidth availability curves (TBACs) that indicate bandwidth availability as a function of time. The first TBAC may indicate available bandwidth based on measurements of actual network conditions and/or projected network conditions. The second TBAC may indicate a reduced bandwidth availability relative to the first TBAC. The second TBA may be generated from the first TBAC, for example, by applying a predetermined reduction to the first TBAC. In this way, the streaming media content adapted by the second TBAC provides a lower data rate than would result if the first TBAC were to be applied. That way, a mobile wireless device may receive streaming media content at a lower data rate when roaming, thereby reducing the roaming charges that would otherwise be incurred.

2. Exemplary Network Architecture

Figure 1:
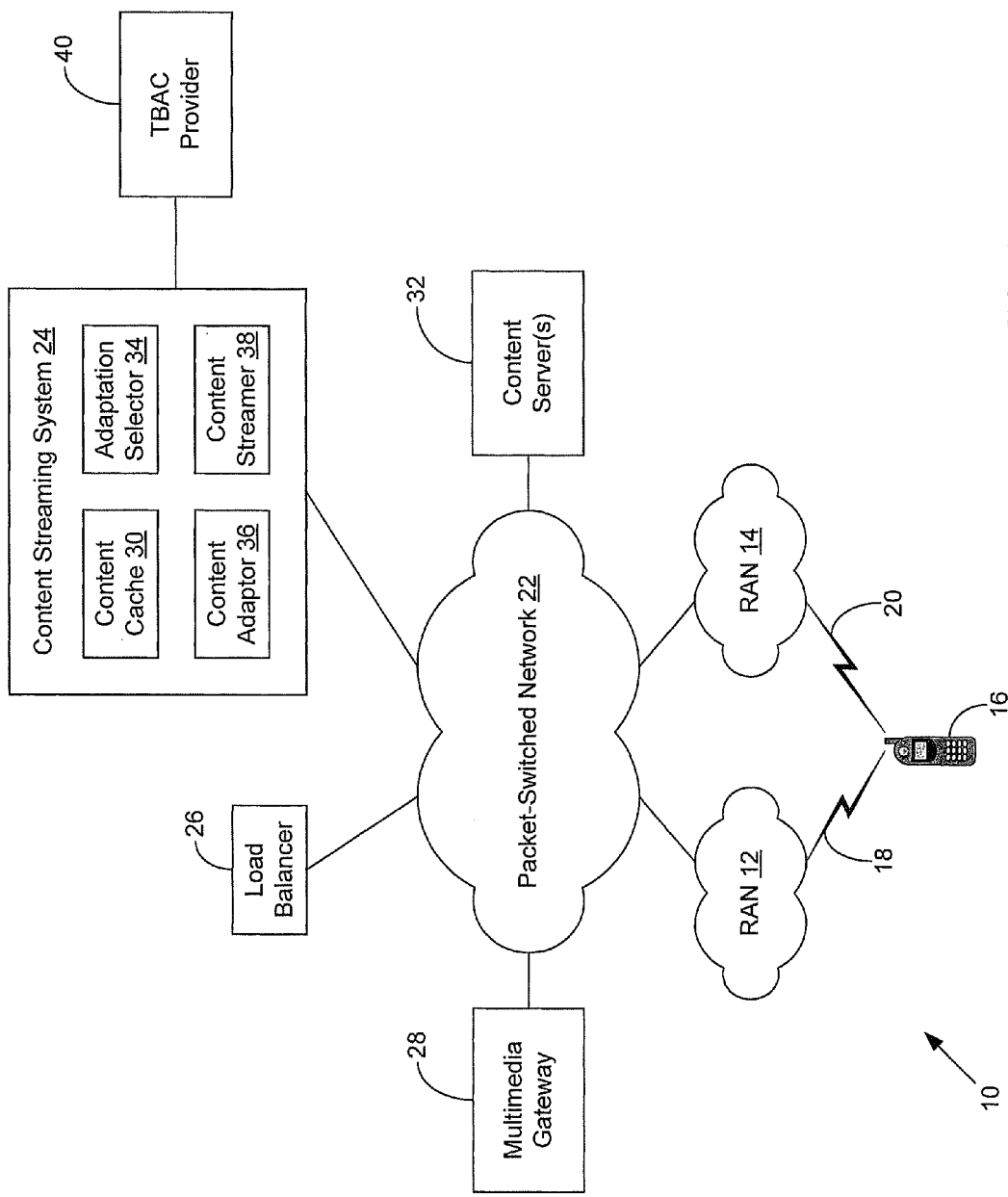
FIG. 1 is a block diagram of a wireless telecommunications network, in accordance with an exemplary embodiment.

FIG. 1 illustrates a wireless telecommunications network 10 in which exemplary embodiments may be employed. Wireless telecommunications network 10 may include a plurality of radio access networks (RANs), exemplified in FIG. 1 by RAN 12 and RAN 14, which provide wireless coverage in a particular market area. A market area could correspond to a city, part of a city, a metropolitan area, or other geographic region. A mobile device 16 may be served by either RAN 12 or RAN 14, depending on where in the market area mobile device 16 is operating. Thus, mobile device 16 may communicate with RAN 12, via air interface 18, when operating in certain locations in the market area, but may communicate with RAN 14, via air interface 20, when operating in other locations in the market area.

RANs 12 and 14 could be operated by either the same wireless service provider or by different wireless service providers. For example, RAN 12 may be operated by the wireless service provider to which mobile device 16 subscribes, and RAN 14 may be operated by a different wireless service provider. In that case, mobile device 16 would be roaming when served by RAN 14. Such roaming by mobile device 16 may incur roaming charges to the subscriber and/or to the subscriber's wireless service provider. The amount of the roaming charges could be based on time, the amount of data that is transferred while roaming, and/or other factors.

Mobile device 16 could be, for example, a wireless telephone, wireless personal digital assistant (PDA), wirelessly-equipment laptop computer, or other type of wireless communication device. The wireless communications via air interfaces 18 and 20 may be in accordance with a specification such as cdma2000 (1xRTT or EVDO), WiFi (802.11), WiMAX (802.16), or GSM/GPRS.

RANs 12 and 14 provide access to a packet-switched network 22, through which media content may be streamed to mobile devices, such as mobile device 16. The streaming media content comprises packets that contain digital content, such as audio and/or video. The streaming media content may be provided by a content streaming system 24, for example, using the Real-time Transport Protocol (RTP) and the Real-time Transport Control Protocol (RTCP). These protocols are described in H. Schulzrinne, et al., "RTP: A Transport Protocol for Real-Time Applications," Request for Comments 3550, July 2003, which is incorporated herein by reference.

In an exemplary embodiment, content streaming system 24 serves a particular market area, such as the market area served by RAN 12 and RAN 14. However, multiple content streaming systems may serve this same market area. In that case, a load balancer 26 may determine which particular content streaming system is used to stream media content to a mobile device, in order to balance the load on the multiple content streaming systems serving that market area.

To request streaming media content, mobile device 16 may communicate with a multimedia gateway 28, for example, using the Real Time Streaming Protocol (RTSP). The RTSP protocol is described in H. Schulzrinne et al., "Real Time Streaming Protocol (RTSP)," Request for Comments 2326, April 1998, which is incorporated herein by reference. Multimedia gateway 28, in turn, may communicate with content streaming system 24 via load balancer 26. Thus, multimedia gateway 28 and load balancer 26 may proxy RTSP and RTCP communications between mobile device 16 and content streaming system 24. The RTP packets containing the streaming media content may flow from content streaming system 24 to mobile device 16 through multimedia gateway 28.

In an exemplary embodiment, content streaming system 24, load balancer 26, and multimedia gateway 28 are all operated by the wireless service provider to which mobile device 16 subscribes. Thus, when mobile device 16 receives streaming digital content from content streaming system 24 while roaming (e.g., while served by RAN 14), roaming charges may be incurred based on the amount of data transferred.

Content streaming system 24 may have access to multiple sources of digital content. For example, content streaming system may store digital content in a content cache 30. The digital content stored in content cache 30 may then be streamed to mobile devices, such as mobile device 16, upon request. Alternatively or additionally, content streaming system 24 may use external sources of digital content. For example, content streaming system 24 may be able to receive digital content (e.g., in the form of RTP packets) from one or more content server(s) 32 via packet-switched network 22. Content streaming system 24 may then stream the digital content from external sources, such as content server(s) 32, to mobile devices, such as mobile device 16, upon request.

Content streaming system 24 may adapt the digital content from internal sources, such as content cache 30, and from external sources, such as content server(s) 32, in accordance with any of a plurality of adaptation metrics. Thus, content streaming system 24 may include an adaptation selector 34 for selecting one of the plurality of adaptation metrics to use for a given media stream, a content adaptor 36 for adapting the original digital content from the internal or external source in accordance with the adaptation metric selected by adaptation selector 34, and a content streamer 38 for streaming the digital content adapted by content adaptor 36 (e.g., to mobile device 16 via multimedia gateway 28).

An adaptation metric may provide an indication of available bandwidth in a particular market area at a particular time. The available bandwidth in a market area could be determined based on actual measurements of network conditions. For example, drive tests may be conducted on a continual basis to determine current network conditions in the market area, or network load data from various network elements may be analyzed in real-time. Alternatively, the available bandwidth could be estimated based on projected network conditions. For example, historical trends may indicate how network load varies during a typical day. In addition, certain type of media broadcasts, such as sporting events, may be known to result in high usage of network resources for receiving streaming media content on mobile devices. Thus, the available bandwidth for a given point in time could be determined based on actual network conditions and/or projected market conditions in the market area.

The bandwidth availability in a given market area may change over time, for example, based on changes in network usage. A temporal bandwidth availability curve (TBAC) may be used to indicate bandwidth availability as a function of time. In particular, content streaming system 24 may use a TBAC as an adaptation metric for adapting streaming media content to changing network conditions.

Figure 2:
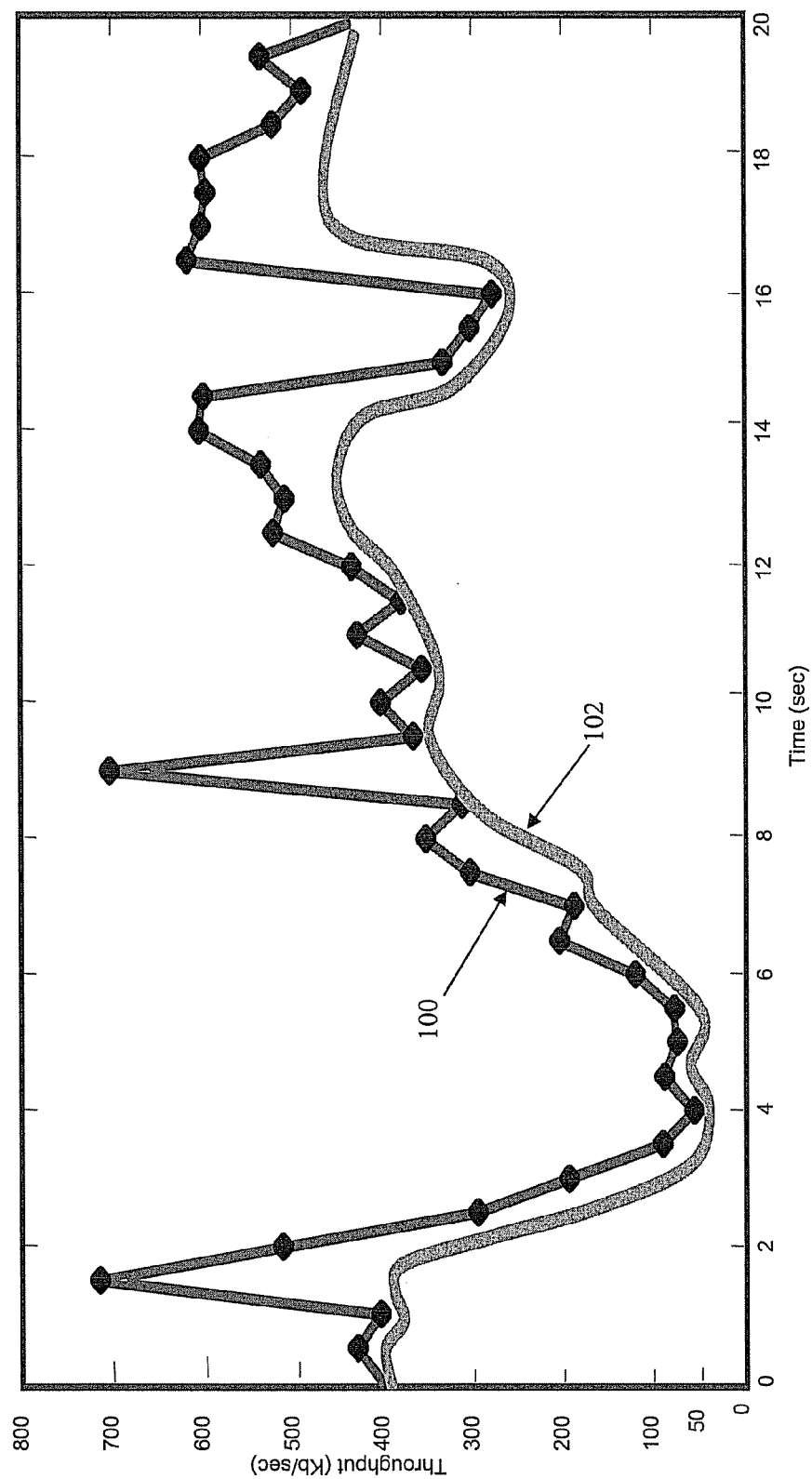
FIG. 2 is a graph showing a temporal bandwidth availability curve (TBAC) and the data rate of streaming media content that has been adapted to fit the TBAC, in accordance with an exemplary embodiment.

FIG. 2 illustrates an example of how a TBAC may be used to adapt streaming media content. In FIG. 2, TBAC 100 shows the available bandwidth as a function of time, and curve 102 shows how content adaptor 36 may adjust the data rate for a media stream in order to fit the available bandwidth indicated by TBAC 100. To adjust the data rate in this way, content adaptor 36 may adjust one or more parameters in the streaming media content, such as the frame rate, frame type, or quantization level.

To obtain the TBAC for a given market area, content streaming system 24 may be communicatively coupled to one or more TBAC providers, such as TBAC provider 40. TBAC provider 40, in turn, may be communicatively coupled, to one or more network monitors or other sources of information, so as to generate a TBAC for a market area based on actual or projected network conditions in that market area.

Adaptation selector 34 may select a TBAC to use as an adaptation metric for a mobile device based, in part, on signaling from the mobile device. Such signaling may include a location indication provided by the mobile device. The location indication could be provided in a LOC header in an RTCP message. For example, when mobile device 16 is served by RAN 12, mobile device 16 may send a location indication corresponding to the market area served by RAN 12. In response, adaptation selector 34 may obtain a TBAC for that market area from TBAC provider 40. Content adaptor 36 may then use that TBAC to adapt the streaming media content going to mobile device 16.

As described in more detail below, adaptation selector 34 may also select which adaptation metric to use based on whether the mobile device is roaming. When the mobile device is roaming in a given market area, adaptation selector 34 may apply a modified TBAC for that market area that indicates a reduced bandwidth availability. To obtain the modified TBAC, adaptation selector 34 may receive the TBAC for that market area from TBAC provider 40 and then apply a predetermined reduction to it (e.g., a fixed percentage reduction or a reduction based on a more complicated algorithm) so as to "artificially" lower the available bandwidth. It is to be understood that this method of obtaining a modified TBAC is exemplary only, as other methods could be used to obtain a modified TBAC to use for roaming mobile devices.

Content streaming system 24 may determine whether a mobile device is roaming based on whether the mobile device has provided a roaming indication. For example, a mobile device, such as mobile device 16, could be configured to provide a roaming indication when it detects that it is roaming. The roaming indication could be provided in a LOC header in an RTCP message, provided in an RTSP ANNOUNCE or RTSP SET_PARAMETER message, or provided in some other way.

In the absence of a roaming indication from a mobile device, adaptation selector 34 may select a first TBAC (e.g., from TBAC provider 40) for that mobile device based on the market area in which the mobile device is operating. However, if content streaming system 24 receives a roaming indication from the mobile device, adaptation selector 34 may switch to a second TBAC that provides a reduced bandwidth availability relative to the first TBAC. Based on this second TBAC, content adaptor 36 will adapt the streaming media content so that it is streamed to the mobile device at a lower data rate than if the first TBAC were used. In this way, the data rate at which digital media content is streamed to a mobile device may be reduced when the mobile device is roaming, thereby reducing the roaming charges that would otherwise be incurred.

3. Exemplary Method of Operation

Figure 3:
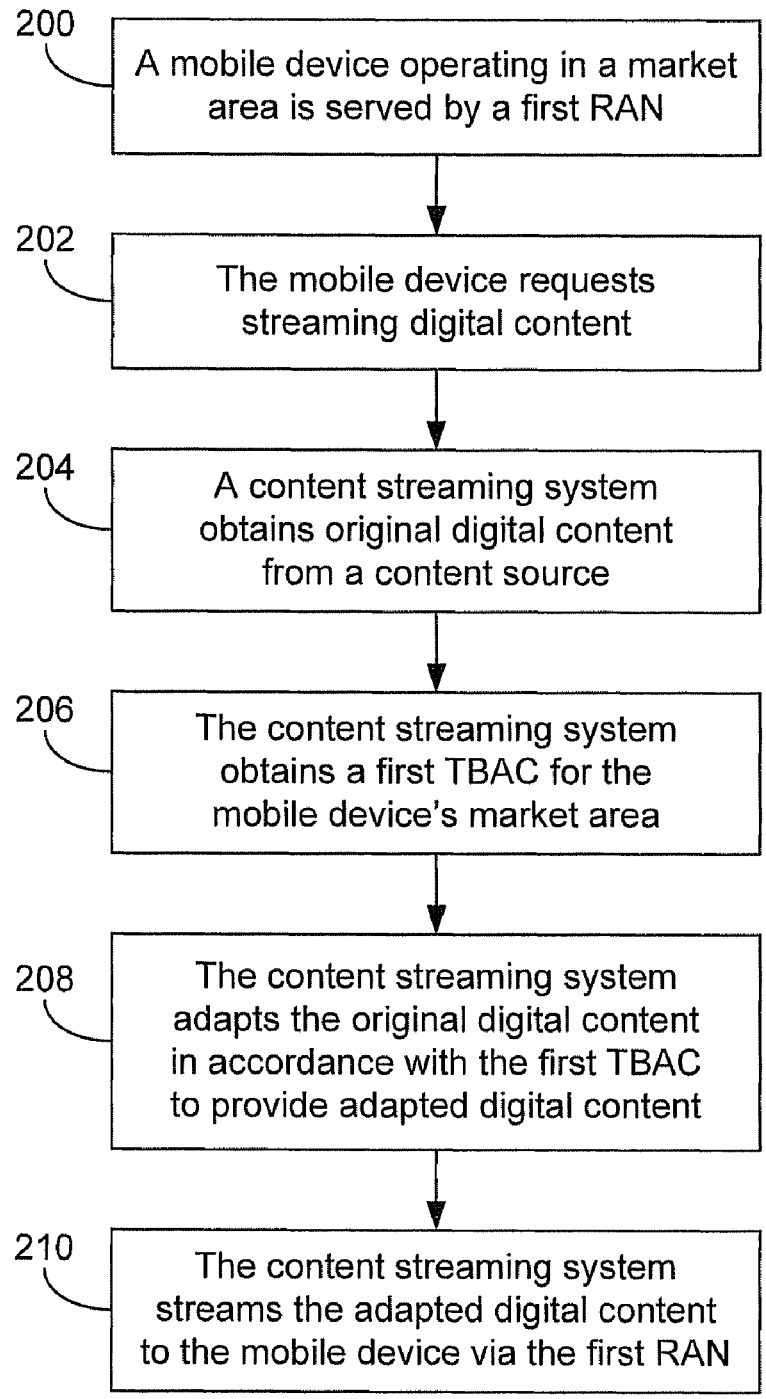
FIG. 3 is a flow chart illustrating a first part of an exemplary method of operation, in accordance with an exemplary embodiment.
Figure 4:
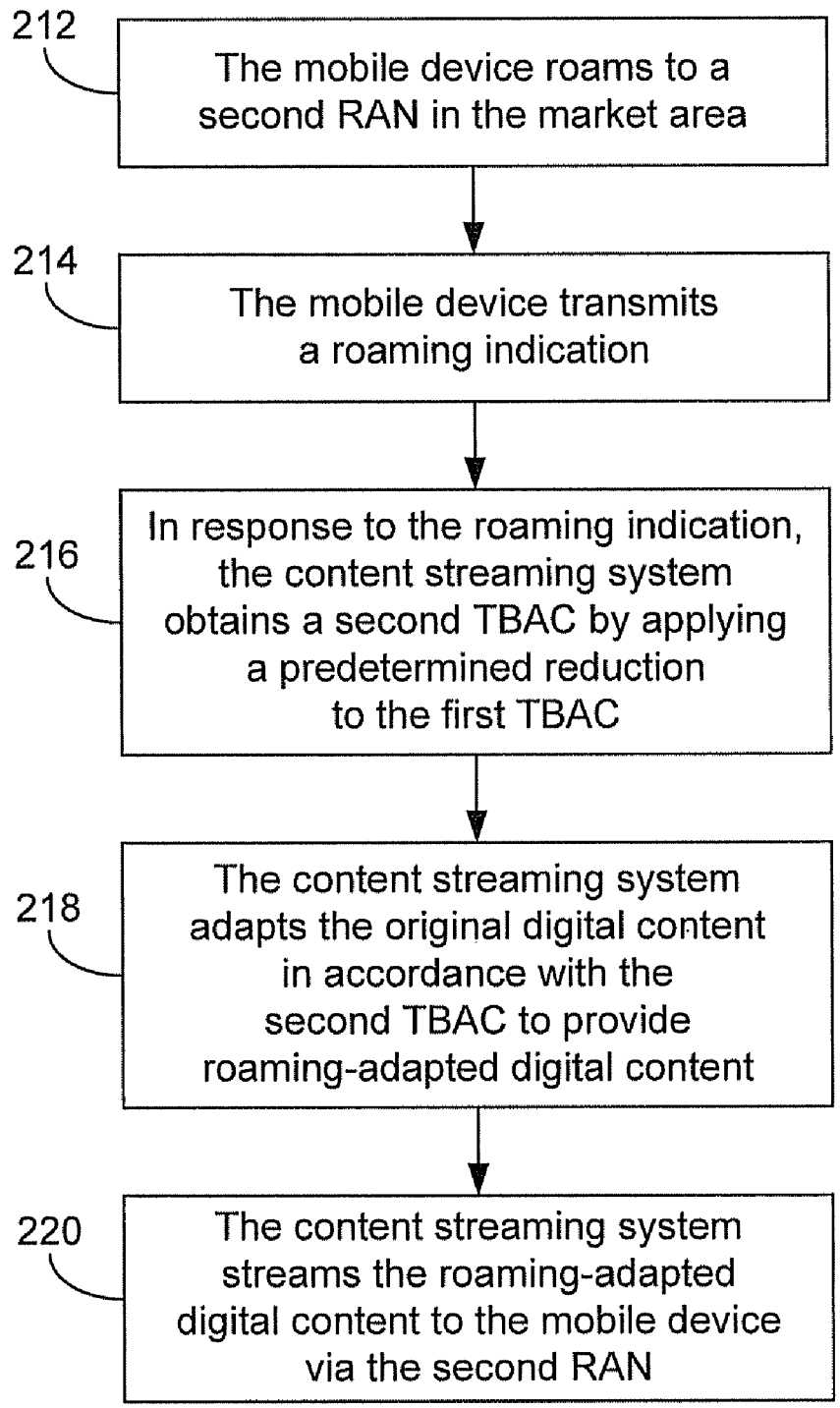
FIG. 4 is a flow chart illustrating a second part of an exemplary method of operation, in accordance with an exemplary embodiment.

FIGS. 3 and 4 illustrate an exemplary method of operation. For purposes of illustration, this exemplary method is described with reference to wireless telecommunications network 10 shown in FIG. 1. It is to be understood, however, that other network architectures could be used.

With reference to FIG. 3, the method may begin with a mobile device (e.g., mobile device 16) operating in a market area and being served by a first RAN (e.g., RAN 12), as indicated by block 200. In this example, the first RAN is associated with a first wireless carrier, and the mobile device is operating under a subscription or service plan with the first wireless carrier. Thus, at this point, mobile device is being served by a "home" network and is not roaming.

While being served by the first RAN, the mobile device requests streaming digital content, as indicated by block 202. The streaming digital content may include audio, video, and/or other media content. The process by which the mobile device requests the streaming digital content may involve several steps. For example, the mobile device may first transmit an RTSP DESCRIBE request to determine what digital content is available, and the user of the mobile device may select a particular item of digital content. In response, to the user's selection, the mobile device may transmit an RTSP SETUP request to configure a media stream for the selected digital content and then transmit an RTSP PLAY request to begin streaming of the selected digital content to the mobile device.

In order to provide the streaming digital content that the mobile device has selected and requested, a content streaming system (e.g., content streaming system 24) may obtain the requested digital in an original form from a content source, as indicated by block 204. The content source could be either an internal source, such as content cache 30, or an external source, such as content server 32.

The content streaming system also obtains a first TBAC (e.g., from TBAC provider 40) that corresponds to the market area in which the mobile device is operating, as indicated by block 206. The content streaming system then adapts the original digital content in accordance with the first TBAC to provide adapted digital content, as indicated by block 208. Finally, the content streaming system streams the adapted digital content to the mobile device via the first RAN, as indicated by block 210.

FIG. 4 continues the exemplary method illustrated in FIG. 3. While the digital content is still being streamed to the mobile device, the mobile device roams to a second RAN in the market area (e.g., RAN 14), as indicated by block 212. In this example, the second RAN is operated by a second, different wireless carrier. Thus, the mobile device is roaming when being served by the second RAN.

The mobile device detects that it is now roaming and, in response, transmits a roaming indication, as indicated by block 214. The roaming indication could be included in a LOC header in an RTCP message, included in an RTSP request, or provided in some other manner. In response to the roaming indication, the content streaming system obtains a second TBAC by applying a predetermined reduction to the first TBAC, as indicated by block 216. The predetermined reduction could be a fixed percentage reduction in the available bandwidth indicated by the second TBAC as compared to the first TBAC. Alternatively, the predetermined reduction may involve a more complicated algorithm for determining the second TBAC based on the first TBAC.

The content streaming system adapts the original digital content in accordance with the second TBAC to provide roaming-adapted digital content, as indicated by block 218. Finally, the content streaming system streams the roaming-adapted digital content to the mobile device via the second RAN, as indicated by block 220.

By indicating a reduced available bandwidth relative to the first TBAC, the second TBAC may be used to artificially reduce the data rate of streaming digital content to a mobile device when it is roaming and thereby reduce the roaming charges that would otherwise be incurred for the streaming digital content.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for providing digital content to a mobile wireless device operating in a market area, said method comprising:
   streaming digital content to said mobile wireless device at a first data rate via a first wireless carrier, wherein said first data rate is selected based on a first available-bandwidth indication;
   receiving a roaming indication, wherein said roaming indication indicates that said mobile wireless device is no longer being served by said first wireless carrier; and
   in response to said roaming indication, streaming said digital content to said mobile wireless device at a second data rate via a second wireless carrier, wherein said second data rate is lower than said first data rate, and wherein said second data rate is selected based on a second available-bandwidth indication that indicates less available bandwidth than said first available-bandwidth indication.

2. The method of claim 1, wherein said first available-bandwidth indication is determined from actual or projected network conditions in said market area.

3. The method of claim 1, further comprising:
   determining said second available-bandwidth indication based on said first available-bandwidth indication.

4. The method of claim 3, wherein determining said second available-bandwidth indication based on said first available-bandwidth indication comprises:
   calculating said second available-bandwidth indication as a predetermined reduction from said first available-bandwidth indication.

5. The method of claim 1, wherein said first and second available-bandwidth indications are time dependent.

6. The method of claim 1, wherein said digital content comprises video content.

7. The method of claim 6, wherein streaming digital content to said mobile wireless device at a first data rate comprises:
   obtaining original video content;
   adapting said original video content to provide first-adapted video content; and
   streaming said first-adapted video content to said mobile wireless device at said first data rate.

8. The method of claim 7, wherein streaming digital content to said mobile wireless device at a second data rate comprises:
   adapting said original video content to provide second-adapted video content; and
   streaming said second-adapted video content to said mobile wireless device at said second data rate.

9. The method of claim 8, wherein adapting said original video content to provide first-adapted video content comprises:
   modulating a frame rate, frame type, or quantization level of said original video content in accordance with said first available-bandwidth indication.

10. The method of claim 9, wherein adapting said original video content to provide second-adapted video content comprises:
    modulating a frame rate, frame type, or quantization level of said original video content in accordance with said second available-bandwidth indication.

11. The method of claim 1, wherein said roaming indication is transmitted by said mobile wireless device.

12. A method for providing digital content to a mobile wireless device operating in a market area, said method comprising:
    obtaining original digital content;
    obtaining a first temporal bandwidth availability curve (TBAC), wherein said first TBAC indicates bandwidth availability as a function of time in said market area;
    adapting said original digital content in accordance with said first TBAC to provide adapted digital content;
    streaming said adapted digital content to said mobile wireless device;
    receiving a roaming indication from said mobile wireless device;
    in response to said roaming indication, obtaining a second TBAC, wherein said second TBAC indicates a reduced bandwidth availability relative to said first TBAC;
    adapting said original digital content in accordance with said second TBAC to provide roaming-adapted digital content; and
    streaming said roaming-adapted digital content to said mobile wireless device.

13. The method of claim 12, wherein said first TBAC is determined from actual or projected network conditions in said market area.

14. The method of claim 13, wherein obtaining a second TBAC comprises applying a predetermined reduction to said first TBAC.

15. The method of claim 12, wherein said original digital content comprises video content.

16. A system for providing digital content to a mobile wireless device operating in a market area, said system comprising:
    a source of original digital content;
    an adaptation selector for selecting from among a plurality of adaptation metrics based on signaling from said mobile wireless device, wherein said plurality of adaptation metrics includes a first total bandwidth availability curve (TBAC) that indicates bandwidth availability as a function of time in said market area and a second TBAC that indicates a reduced bandwidth availability relative to said first TBAC;

a content adaptor for adapting said original digital content, in accordance with an adaptation metric selected by said selection system, to provide adapted digital content; and a content streamer for streaming said adapted digital content to said mobile wireless device.

17. The system of claim 16, wherein said signaling from said mobile wireless device includes a roaming indication, and wherein said selector is configured to select said first TBAC when said roaming indication is absent and to select said second TBAC when said roaming indication is present.

18. The system of claim 17, further comprising:

a TBAC determination system for determining said first TBAC based on actual or projected network conditions in said market area.

* * * * *